United States Patent
Beregi et al.

[15] 3,696,117
[45] Oct. 3, 1972

[54] AZABICYCLOALKYL UREA COMPOUNDS

[72] Inventors: Laszlo Beregi, Boulogne S/Seine; Pierre Hugon, Rueil-Malmaison; Pierre Desnoyers, Fontenay-aux-Roses, all of France

[73] Assignee: Societe en nom collectif "Science Union et Rie, Societe Francaise de Recherche Medicale", Suresnes, France

[22] Filed: Sept. 28, 1970

[21] Appl. No.: 76,204

[30] Foreign Application Priority Data

March 10, 1969 Great Britain..........48,645/69

[52] U.S. Cl..............................260/326.3, 424/274
[51] Int. Cl..............................C07d 27/30
[58] Field of Search....................260/326.3

[56] References Cited

UNITED STATES PATENTS 3,491,113   1/1970   Schenker et al........260/326.1

*Primary Examiner*—Alex Mazel
*Assistant Examiner*—Joseph A. Narcavage
*Attorney*—Gordon W. Hueschen and Talivaldis Cepuritis

[57] ABSTRACT

N-aroyl-N'-(3-azabicycloalkyl) ureas of the formula:

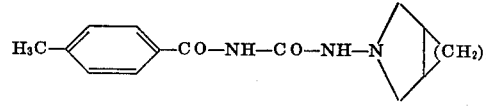

wherein $n$ is 1, 2 or 3.

These compounds possess fibrinolytic and platelet stickiness decreasing properties, decrease the capillary permeability, increase their resistance and improve the microcirculation.

2 Claims, No Drawings

AZABICYCLOALKYL UREA COMPOUNDS

The present invention provides N-aroyl-N'-(3-azabicycloalkyl) ureas of the general formula:

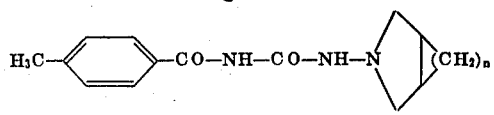

I wherein n is an integer from 1 to 3 inclusive.

In the above general formula the radical of the formula:

II represents the following 3-azabicyclo alkane radicals of the formulae:

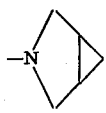

III

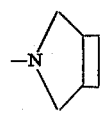

IV

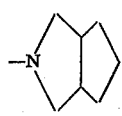

V

The invention also includes the salts, especially the physiologically tolerable salts, of the above compounds.

The N-aroyl-N'-(3-azabicycloalkyl) ureas of the present invention are new compounds and can be prepared by reacting para-toluoyl isocyanate with a N-amino-3-azabicyclo alkane of the general formula:

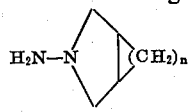

VI wherein n has the meaning given above.

The N-amino-3-azabicyclo alkanes used as starting material may be prepared by means of the process of J.B. Wright, R.E. Willette — J. Med. and Pharm. Chem., 5, 819 (1962), which involves nitrosating a 3-azabicyclo alkane and reducing the resulting N-nitroso derivative with lithium aluminum hydride.

The 3-azabicyclo alkanes employed in this invention may be obtained by converting, respectively, the known cyclopentane, cyclobutane and cyclopropane dicarboxylic acids into imides by the method of H. Najer, R. Giudicelli — Bull. Soc. Chim. France, 1593 (1962), and finally submitting the imides to reduction by means of lithium aluminum hydride, following the method described by R. Griot, Helv. Chim. Acta. 42, 67 (1959).

The compounds of the invention may be readily obtained in the form of their salts with suitable acids, especially acids yielding physiologically tolerable salts. Among the acids that may be used, hydrochloric, hydrobromic, sulphonic, acetic, malonic, maleic, fumaric, tartaric and malic acids may be mentioned.

The present invention also includes the salts formed with an alkali metal hydroxide, an alkaline earth metal hydroxide, an alkali metal carbonate, an alkaline earth metal carbonate and an alkali metal bicarbonate.

The following examples illustrate the present invention, all parts being by weight and melting points being determined on a Kofler block (K), or on a Kofler heater under a microscope (MK).

EXAMPLE 1

N-para-toluoyl-N'-[3-azabicyclo (3,3,0) oct-3-yl] urea

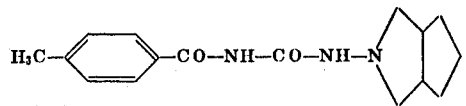

To a solution of 8 parts of para-toluoyl isocyanate in 80 parts of anhydrous benzene there were added during 20 minutes 6.3 parts of N-amino-3-azabicyclo (3,3,0) octane dissolved in 40 parts of benzene. The mixture was stirred for 2 hours. The resulting solution crystallized on cooling. 5.75 parts of crude product were obtained and a further 11.5 parts were obtained by evaporating to dryness the remaining solution.

The combined crude products yielded by recrystallization in 80 parts of isopropanol, 10.6 parts of N-para-toluoyl-N'-[3-azabicyclo (3,3,0) oct-3-yl] urea, M.P. (K) 173° C ; M.P. (MK) 165° to 166° C.

EXAMPLES 2 to 3

By the same process as described in Example 1, the following urea compounds were obtained :

2. N-para-toluoyl-N'-[3-azabicyclo (3,2,0) hept-3-yl] urea, starting from paratoluoyl isocyanate and N-amino-3-azabicyclo (3,2,0) heptane.

3. N-para-toluoyl-N'-[3-azabicyclo (3,1,0) hex-3-yl] urea, starting from paratoluoyl isocyanate and N-amino-3-azabicyclo (3,1,0) hexane.

The new compounds of the present invention, and their physiologically tolerable salts possess valuable therapeutic and pharmacological properties, especially fibrinolytic and platelet stickiness decreasing properties; they decrease the capillary permeability, increase their resistance and improve the microcirculation.

Their toxicity is very weak and the $LD_{50}$ studied in mice is exceeding 3 g/kg per oral route.

The measure of the plasmatic euglobulin lysis time described as micromethod by von Kaulla (Thromb. Diath. Haemorrhag. 15 , 284 (1966)) was used to determine the fibrinolytic potential. It was noted that the products administered to the rat at the dose of 200 mg/kg P.O. increase the euglobulin lysis time of 12 to 16 percent after 1 to 2 hours.

The activity on the platelet stickiness was evidenced by the method of E.W. Salzmann (J. Lab. Clin. Med. 62, 724 (1963)). It was noted that the compounds of the invention, administered at the dose of 200 mg/kg per os decrease the stickiness of the thrombocytes by 25 to 30 percent, and inhibit the stickiness increasing action of adenosine diphosphate.

The activity on the capillary permeability was observed by the method of Ambrose and Eds (J. Pharm. Exp. Therap. 90, 359 (1947)). It was noted a time increasing of the apparition of the coloration in comparison with the untreated animals. Parrot's method was used to measure the capillary resistance (C.R. Soc. Biol. 140. 750 (1946)). It was found that compounds of the present invention increase considerably the capillary resistance.

The low toxicity and the properties here-above described permit the use of the new compounds in therapy, especially in the prevention and in the treatment of the thromboembolic disease, angiopathies and capillary brittleness.

The invention also provides pharmaceutical compositions containing a compound of the general Formula I or one of its physiologically tolerable salts in admixture or conjunction with suitable pharmaceutical carriers, such as, for example, distilled water, glucose, lactose, starch, talc, magnesium stearate, cocoa butter. These pharmaceutical compositions may be form of tablets, dragees, capsules, suppositories or injectable solutions, and may be administered by oral, rectal or parenteral route at the doses of 50 to 500 mg 1 to 5 times per day.

WHAT WE CLAIM IS:

1. A compound selected from the group consisting of:

A. N-aroyl-N'-(3-azabicycloalkyl) ureas of the general formula:

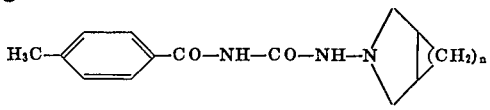

wherein $n$ is an integer from 1 to 3 inclusive; and

B. physiologically tolerable addition salts thereof with suitable acids and bases.

2. A compound of claim 1 which is N-para-toluoyl-N'-[3-azabicyclo (3,3,0) oct-3-yl] urea.

* * * * *